United States Patent [19]

Pike

[11] Patent Number: 4,557,735

[45] Date of Patent: Dec. 10, 1985

[54] METHOD FOR PREPARING AIR FOR SEPARATION BY RECTIFICATION

[75] Inventor: Reginald A. Pike, Grand Island, N.Y.

[73] Assignee: Union Carbide Corporation, Danbury, Conn.

[21] Appl. No.: 581,536

[22] Filed: Feb. 21, 1984

[51] Int. Cl.[4] ............................................. B01D 53/04
[52] U.S. Cl. ......................................... 55/26; 55/68; 55/75; 62/18; 62/31
[58] Field of Search .................... 55/25, 26, 62, 75; 62/17, 18, 31

[56] References Cited

U.S. PATENT DOCUMENTS

| | | | |
|---|---|---|---|
| 3,209,548 | 10/1965 | Grunberg et al. | 62/18 X |
| 3,210,950 | 10/1965 | Lady | 62/18 X |
| 3,416,323 | 12/1968 | Heinik | 62/18 |
| 3,498,067 | 3/1970 | Ranke | 62/17 |
| 3,731,495 | 5/1973 | Coveney | 62/39 |
| 3,894,856 | 7/1975 | Lofredo et al. | 62/17 X |
| 3,967,464 | 7/1976 | Cormier et al. | 62/18 X |
| 4,152,130 | 5/1979 | Theobald | 62/18 |
| 4,224,045 | 9/1980 | Olszewski et al. | 62/30 |
| 4,329,158 | 5/1982 | Sircar | 55/26 |
| 4,367,082 | 1/1983 | Tomisaka et al. | 62/13 |
| 4,372,764 | 2/1983 | Theobald | 62/18 X |
| 4,375,367 | 3/1983 | Prentice | 62/18 X |
| 4,382,366 | 5/1983 | Gaumer | 62/31 |

Primary Examiner—Robert Spitzer
Attorney, Agent, or Firm—Stanley Ktorides

[57] ABSTRACT

A method for preparing air for separation by rectification wherein the steps of compression, cooling and cleaning of the feed air are related by the use of a nitrogen-rich stream withdrawn from the air separation facility.

15 Claims, 2 Drawing Figures

METHOD FOR PREPARING AIR FOR SEPARATION BY RECTIFICATION

TECHNICAL FIELD

This invention relates generally to the separation of air by cryogenic rectification and more particularly to the preparation of the air for the rectification.

BACKGROUND ART

Ambient air which is to be separated by cryogenic rectification must undergo certain preparatory operations to render it suitable for the operation of the air separation facility. In particular, the air must be compressed to a pressure greater than ambient pressure, cooled, and substantially cleansed of high boiling impurities such as water vapor and carbon dioxide.

It would be desirable to integrate these three operations in a way such that they may be carried out by a single integrated system.

The compressed feed air is characterized by having a certain heat of compression. It is desirable to efficiently employ this heat of compression to carry out the feed air preparation.

It is thus further desirable to have the three air preparation steps carried out by an efficient, integrated system wherein process energy is utilized efficiently.

It is therefore an object of this invention to provide a method for the preparation of feed air for separation by cryogenic rectification wherein the preparatory steps of compression, cooling and cleaning of the feed air are carried out by an integrated system.

It is another object of this invention to provide a method for the preparation of feed air for separation by cryogenic rectification wherein the preparatory steps of compression, cooling and cleaning of the feed air are carried out by an integrated system that efficiently utilizes process stream energy.

It is yet another object of this invention to provide a method for the preparation of feed air for separation by cryogenic rectification wherein the feed air heat of compression is efficiently employed to carry out the feed air preparation.

SUMMARY OF THE INVENTION

The above and other objects which will become apparent to one skilled in the art upon a reading of this disclosure are attained by:

A method for preparing feed air for separation by cryogenic rectification in an air separation facility, whereby the preparatory steps of compression, cooling and cleaning of the feed air are carried out by an integrated system, comprising:

(a) compressing feed air;

(b) cooling the compressed feed air;

(c) passing the cooled, compressed feed air through a first purifier containing heat regenerable adsorbent wherein the air is substantially cleaned of impurities by transfer of the impurities to the adsorbent;

(d) introducing the cleaned, cooled, compressed feed air into an air separation facility;

(e) separating the feed air by cryogenic rectification in the air separation facility into nitrogen-rich and oxygen-rich components;

(f) withdrawing a portion of the nitrogen-rich component from the air separation facility;

(g) warming the withdrawn portion by indirect heat exchange with at least a portion of the cooling compressed feed air of step (b);

(h) passing the warmed portion through a second purifier containing heat regenerable adsorbent which contains impurities so as to transfer those impurities to the warmed portion and thus clean the adsorbent;

(i) expanding the impurity-containing portion through an expansion turbine for the production of external work;

(j) employing at least a portion of said external work to compress the feed air of step (a); and (k) periodically switching the first and second purifiers so that during the switched time the cooled compressed feed air passes through the second purifier containing adsorbent which has been cleaned during the previous period, and the warmed portion passes through the first purifier to remove impurities from the adsorbent deposited there during the previous period.

The term "air separation facility" is used herein to mean a plant to cryogenically separate air into nitrogen-richer and oxygen-richer components. Typical examples of an air separation facility are a single column and a double column air separation plant.

The term "heat regenerable adsorbent" is used herein to mean an adsorbent which has a higher adsorption capacity at cooler temperatures so that the heating of impurity-laden adsorbent will cause the adsorbent to release impurities. A typical example of heat regenerable adsorbent is molecular sieve.

The term "column" is used herein to mean a distillation or fractionation column, i.e., a contacting column or zone wherein liquid and vapor phases are countercurrently contacted to effect separation of a fluid mixture, as for example, by contacting of the vapor and liquid phases on a series of vertically spaced trays or plates mounted within the column or alternatively, on packing elements with which the column is filled. For an expanded discussion of fractionation columns see the Chemical Engineer's Handbook, Fifth Edition, edited by R. H. Perry and C. H. Chilton, McGraw-Hill Book Company, New York Section 13, "Distillation" B. D. Smith et al, page 13-3. *The Continuous Distillation Process.*

The term, "double column", is used herein to mean a higher pressure column having its upper end in heat exchange relation with the lower end of a lower pressure column. An expanded discussion of double columns appears in Ruheman "The Separation of Gases" Oxford University Press, 1949, Chapter VII, Commercial Air Separation.

The term "impurities" is used herein to mean constituents of the feed air stream such as carbon dioxide, water and hydrocarbons such as acetylene, having a higher boiling point relative to the major components of air such as oxygen and nitrogen.

DETAILED DESCRIPTION

Figure 1:
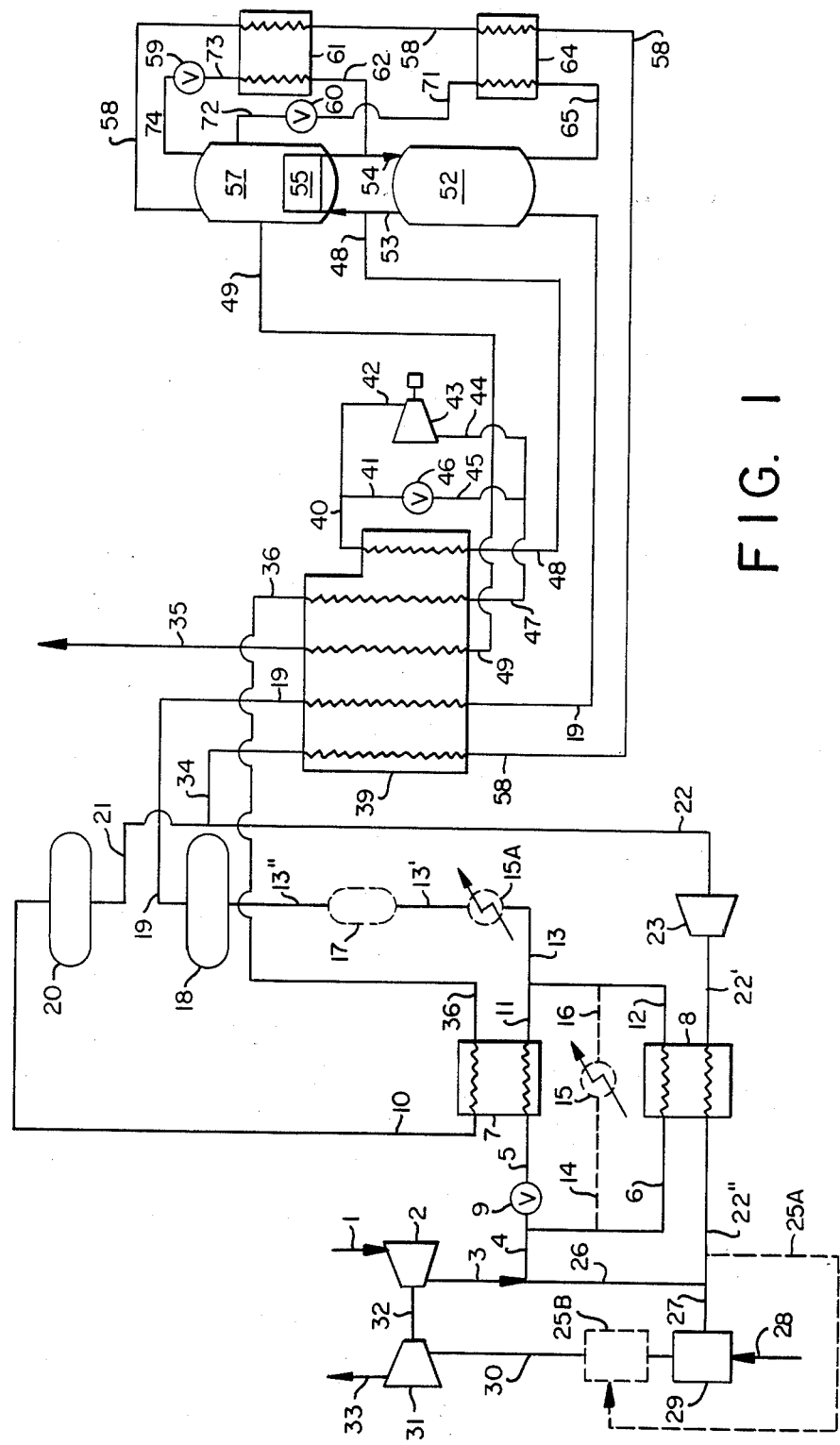
FIG. 1 is a schematic flow diagram of one preferred embodiment of the process of this invention.

The method of this invention whereby compression, cooling and cleaning of feed air is advantageously carried out by an integrated system will be described in detail with reference to the drawing. FIG. 1 is a flow diagram of one preferred embodiment of the process of this invention and illustrates a number of additional options which one may employ with the method of this invention.

Referring now to FIG. 1, feed air at ambient conditions is introduced through conduit 1 to compressor 2 wherein it is compressed to the desired pressure. The desired pressure may be in the range of from about 85 to 493 psia and preferably exceeds 100 psia.

A portion of the compressed air is passed through conduits 3 and 4, through directional valve 9 and through conduit 5 to heat exchanger 7. In heat exchanger 7 the compressed feed air is cooled by indirect heat exchange with nitrogen-rich gas from the air separation facility. The remaining part of the compressed air is passed through conduit 6 to heat exchanger 8, where it is cooled by the nitrogen stream to be expanded. These steps will be described in greater detail later.

The compressed and cooled air is then passed through conduits 11, 12 and 13 to purifier 18. Passage of the air through heat exchangers 7 and 8 serves to cool the feed air and to transfer its heat of compression to the nitrogen-rich gas. If one desired, one could optionally further cool the feed air by passing it through heat removal unit 15A and/or chiller 17.

In purifier 18 the compressed cooled feed air is substantially cleaned of impurities. Purifier 18 contains heat regenerable adsorbent. The preferred adsorbent is molecular sieve. As the feed air passes through the adsorbent, impurities in the feed air are adsorbed by the adsorbent thus cleaning the air. Any heat regenerable adsorbent which is capable of removing impurities from the feed air may be used with the method of this invention.

The compressed, cooled and cleaned feed air then passes out of purifier 18 in conduit 19 and preferably is further cooled by passage through heat exchanger 39. Heat exchanger 39 serves to further cool the feed air by indirect heat exchange with return streams from the air separation facility including nitrogen-rich gas. The embodiment of FIG. 1 illustrates the preferred arrangement wherein the air separation facility is a double column air separation plant. The compressed, cooled and cleaned feed air in conduit 19 is introduced into column 52 wherein it is separated by cryogenic rectification into a nitrogen-rich and oxygen-enriched component. The nitrogen-rich component is passed 53 to condenser 55 where it condenses and is returned 54 to column 52 as liquid reflux. The oxygen-enriched component is removed from column 52 through conduit 65.

The embodiment of FIG. 1 is a preferred embodiment wherein column 52 is in heat exchange relation with another column 57 which is operating at a pressure less than that of column 52. For example, in such a double column arrangement the higher pressure column 52 may operate at a pressure in the range of from about 85 to 493 psia, while the lower pressure column 57 operates at pressure below that of column 52. When the air preparation method of this invention is employed in conjunction with a gas turbine, it is preferred that the ignition pressure of the gas turbine be at least 85 psia, i.e. substantially the same pressure as the higher pressure column.

In this double column arrangement the oxygen-enriched component is further separated in lower pressure column 57 into oxygen-rich gas and lower pressure nitrogen-rich gas. The oxygen-enriched component from column 52 is preferably cooled by passage through heat exchanger 64 by indirect heat exchange with outgoing lower pressure nitrogen-rich gas and passed through conduit 71, expansion valve 60, conduit 72 and into column 57. In column 57 the liquid bottoms are reboiled by heat exchange with the condensing nitrogen-rich component. Preferably some of the condensed nitrogen rich component is passed to the lower pressure column for use as reflux by passage through conduit 62, cooling by indirect heat exchange with lower pressure nitrogen-rich gas in heat exchanger 61 and passage through conduit 73, expansion valve 59, conduit 74 and introduction into column 57. Oxygen product having a purity of from 90 to 99.5 percent may, if desired, be recovered. In the preferred embodiment of FIG. 1, oxygen product is removed from column 57 through conduit 49, warmed in heat exchanger 39 and recovered as stream 35.

The preparatory steps of compression cooling and cleaning of the feed air are integrated by relationship of each step with a stream comprising a portion of the nitrogen-rich component from the air separation facility.

Returning now to FIG. 1, a portion of the nitrogen-rich component, prior to passage to condenser 55, is withdrawn through conduit 48. This portion is preferably sized to match the requirements for regeneration and other uses to which it will be put. As such the flowrate of the withdrawn portion is generally from 5 to 20 percent, preferably from 7 to 12 percent of the feed air flowrate to the air separation facility.

Preferably the withdrawn nitrogen-rich portion is at a pressure above ambient by at least an amount equal to the pressure drop through the adsorbent beds. This pressure drop is usually less than 10 psi. In the FIG. 1 embodiment the withdrawn nitrogen-rich portion is at a pressure about that of the higher pressure column.

The withdrawn nitrogen-rich portion is preferably employed to cool the feed air by indirect heat exchange in heat exchanger 39. Most preferably the withdrawn nitrogen-rich portion is expanded to produce refrigeration prior to cooling the feed air. FIG. 1 illustrates this most preferred embodiment employing a turboexpander and this option will now be described.

Withdrawn nitrogen-rich portion in conduit 48 is passed partially through heat exchanger 39 from which it emerges as stream 40. Stream 40 is then divided into two streams 41 and 42. Stream 42 is passed through expansion turbine 43 wherein refrigeration is produced by expansion. Stream 41 is expanded through Joule-Thompson valve 46 and emerges as stream 45 which is combined with stream 44 from the expansion turbine to form stream 47. This arrangement is employed because generally the refrigeration required is less than that which would be attained if the entire stream 40 passed through expansion turbine 43. Of course, the entire stream 40 could be passed through expansion turbine 43 if this is thought desirable.

Combined stream 47, which comprises the withdrawn nitrogen-rich portion, traverses the entire length of heat exchanger 39 thereby further cooling the incoming feed air. The withdrawn nitrogen-rich portion emerges from heat exchanger 39 as stream 36 which is passed through heat exchanger 7 to cool the compressed feed air in the heat exchange step previously described. The now warmed nitrogen-rich portion emerges from heat exchanger 7 as stream 10 which is passed to purifier 20.

Purifier 20 contains heat regenerable adsorbent containing impurities which were deposited thereon by transfer from feed air during an alternate cycle. The warmed nitrogen-rich portion passes through purifier 20 and in the process these deposited impurities are transferred from the adsorbent to the nitrogen-rich portion, thus serving to regenerate the adsorbent for the next cycle. Thus the heat of compression of the feed air, which was transferred to the nitrogen-rich portion, is efficiently employed to heat the adsorbent in purifier 20. The heated adsorbent thus releases the impurities which are swept up into the flow of the nitrogen-rich portion.

The now impurity-containing nitrogen-rich portion emerges from purifier 20 as stream 21. This impurity-containing nitrogen-rich portion is then passed to power turbine 31 wherein it is expanded to produce external work and from which it emerges as stream 33. At least some of the work obtained from power turbine 31 is used to drive compressor 2 to compress the feed air. Compressor 2 may be directly connected to turbine 31 by shaft 32 as shown in FIG. 1. Alternatively, work may be transferred from turbine 31 to compressor 2 by a system of gears, or turbine 31 could drive an electrical generator which supplies electric energy to an electric motor to drive compressor 2. Any means of transferring work from turbine 31 to compressor 2 is acceptable. Some of the work obtained from power turbine 31 may also be used to drive nitrogen compressor 23 whose function, if used, will be described later.

Thus the nitrogen-rich portion which was used to cool the incoming feed air and which used the feed air heat of compression to regenerate the feed air purifier is also used to help drive the compressor to compress the feed air. This results in a very efficient employment of heat and pressure energy to prepare the feed air for cryogenic rectification.

Preferably, newly cleaned purifier 20, which has been warmed due to the passage of the warm nitrogen-rich portion through it, is cooled prior to the next cycle, i.e. prior to the passage of feed air through it. FIG. 1 illustrates a preferred method of effecting this cooling. When it is desired to cool the now cleaned purifier, directional valve 9 is closed. In this way the nitrogen-rich portion in stream 36 does not pick up heat upon passage through heat exchanger 7. Instead the entire compressed feed air stream passes through conduit 6 and is cooled by indirect heat exchange through heat exchanger 8 with the impurity-containing nitrogen-rich portion. The cooled compressed feed air emerges from the heat exchanger 8 as stream 12 which then proceeds toward purification. A further option is shown in FIG. 1 wherein a portion of the compressed feed air is passed through conduit 14, cooled through heat removal unit 15 and passed through conduit 16 toward purification.

The embodiment employing expansion turbine 43 may be employed when it is desirable to recompress the impurity-containing nitrogen rich portion prior to its introduction to power turbine 31 in order to increase the efficiency of the turbine. In this situation, the impurity-containing nitrogen-rich portion is compressed by passage through compressor 23.

FIG. 1 illustrates a preferred embodiment wherein the lower pressure nitrogen rich gas is also employed to produce work in turbine 31, instead of being released or separately recovered. Referring back to FIG. 1, the lower pressure nitrogen-rich gas is removed from the lower pressure column 57 through conduit 58 warmed by passage through heat exchangers 61 and 64 and 39 from which it emerges as stream 34. Stream 34 is then preferably combined with the impurity-containing nitrogen-rich portion to produce combined stream 22. This combined stream may then pass through compressor 23 and heat exchange 8 whose function has been previously described. The combined stream is then passed to power turbine 31 for the production of work.

FIG. 1 illustrates a particularly preferred embodiment wherein a gas power system is combined with an air separation facility. Such an arrangement is described in U.S. Pat. No. 3,731,495—Coveney and U.S. Pat. No. 4,224,045 Olszewski et al. In this particularly preferred embodiment, some of the air compressed in compressor 2 is passed through conduits 26 and 27 to combustion chamber 29 wherein it is mixed with fuel introduced through conduit 28 and ignited. The impurity-containing nitrogen-rich portion may enter the combustion chamber such as combined with the air, or may bypass the combustion chamber by means of conduit 25A, and combine with the combustion gases in quenching chamber 25B wherein some cooling of the combustion gases takes place by the addition of the nitrogen waste stream. The combustion products and impurity-containing nitrogen-rich portion then pass to power turbine 31 through conduit 30. The pressure in combustion chamber 29 at ignition is preferably as least 80 psia because power turbine 31 is more efficient at pressures of 80 psia or greater. When this combustion chamber embodiment is employed, further energy may be recovered from the gases exiting power turbine 31 in conduit 33. Examples of how to recover further energy from such gases are described in U.S. Pat. No. 3,731,495—Coveney. The Coveney patent also describes arrangements for constructing the combustion chamber, turbine, and compressor as one unit, an arrangement which would be a useful way to implement this process.

Figure 2:
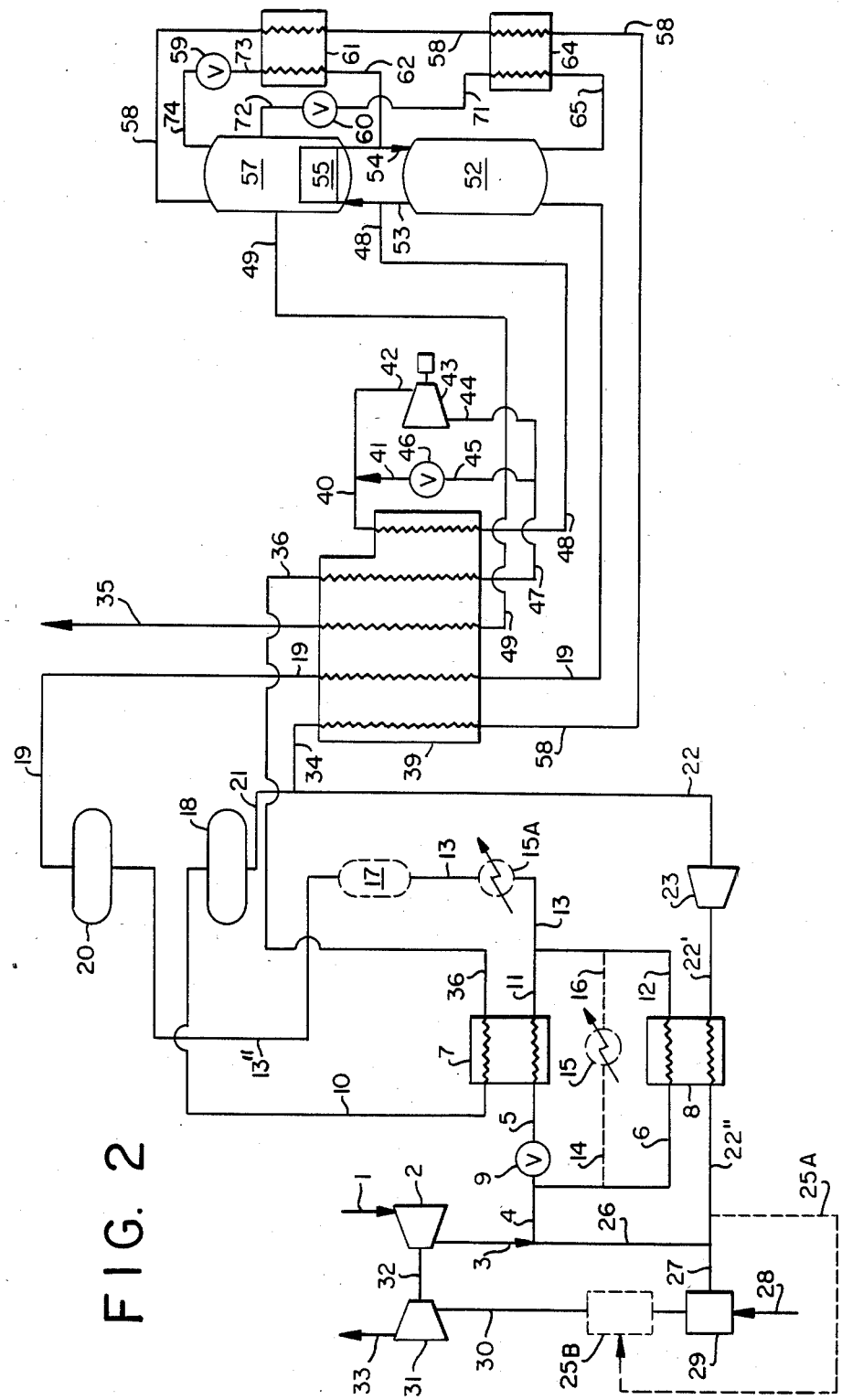
FIG. 2 is a schematic flow diagram of the preferred embodiment of FIG. 1 in the next cyclic period.

After the air preparation has been conducted for some period of time as shown in FIG. 1 with purifier 18 cleaning the feed air while purifier 20 is being cleaned by the nitrogen-rich portion, the purifiers are switched so that the formerly dirty, now clean purifier cleans the feed air and now impurity-laden purifier is cleaned by the nitrogen-rich portion. The period of time between purifier switches will vary depending on the concentration of impurities in the feed air, the feed air flow rate, and the size and type of purifier bed. Generally this period of time will be in the range of from about 2 to 10 hours. About one-half or less of this time may be spent purging the impurity laden purifier with the remainder of the period spent cooling it. FIG. 2 is a schematic flow diagram identical to FIG. 1 except that the purifiers have been switched. FIG. 2 thus illustrates the method of this invention in the next cycle or period. Of course, in actual practice there would not be the physical piping changes which are schematically shown for simplification in FIG. 2. Rather the flow changes would be made by an appropriate arrangement of valves. As the air separation process continues, the feed air preparation method of this invention would then periodically alternate between the FIG. 1 and the FIG. 2 modes.

As previously indicated one may use the air separation process described herein to recover oxygen from stream 35 and nitrogen from stream 58. Furthermore, some nitrogen could be recovered from stream 48 while it is still free of impurities and some liquid nitrogen could be recovered from stream 54. The recovered nitrogen may have a purity of 95 percent or more.

By the use of the method of this invention the three feed air preparation steps are integrated, thus significantly simplifying the overall arrangement. The withdrawn nitrogen-rich portion from the rectification column serves to cool the incoming feed air, provides energy to compress the incoming feed air and cleans the purification system which cleans the feed air. Further, the method of this invention is advantageous because it is able to use the heat of compression of the feed air to regenerate the purifiers thus usefully employing this heat rather than inefficiently dissipating it in an aftercooler.

The following is a tabular summary of a computer simulation of the method of this invention carried out in accord with the illustrated embodiment. It is provided for illustrative purposes and is not intended to be limiting. The stream numbers refer to the stream numbers of the Drawings. The symbol K represents one thousand.

TABLE I

| | Heating Mode | | | Cooling Mode | | | Composition | |
|---|---|---|---|---|---|---|---|---|
| Stream | Flow K lbs/hr | Pres. psia | Temp. °F. | Flow K lbs/hr | Pres. psia | Temp. °F. | $O_2$ wt % | $N_2 + Ar$ wt % |
| 1 | 1742 | 14.4 | 60 | 1742 | 14.4 | 60 | 23 | 77 |
| 3 | 1742 | 225 | 780 | 1742 | 225 | 780 | 23 | 77 |
| 4 | 452 | 225 | 780 | 452 | 225 | 780 | 23 | 77 |
| 5 | 27 | 225 | 780 | 0 | — | — | 23 | 77 |
| 6 | 328 | 225 | 780 | 359 | 225 | 780 | 23 | 77 |
| 10 | 33 | 72 | 620 | 33 | 72 | 40 | 2.5 | 97.5 |
| 11 | 27 | 223 | 50 | 0 | — | — | 23 | 77 |
| 12 | 328 | 223 | 305 | 359 | 223 | 275 | 23 | 77 |
| 13 | 452 | 223 | 245 | 452 | 223 | 240 | 23 | 77 |
| 13' | 452 | 221 | 80 | 452 | 221 | 80 | 23 | 77 |
| 13" | 452 | 220 | 40 | 452 | 220 | 40 | 23 | 77 |
| 14 | 97 | 225 | 780 | 93 | 225 | 780 | 23 | 77 |
| 16 | 97 | 223 | 100 | 93 | 223 | 100 | 23 | 77 |
| 19 | 452 | 218 | 44 | 452 | 218 | 44 | 23 | 77 |
| 21 | 33 | 70 | 620 | 33 | 70 | 40 | 2.5 | 97.5 |
| 22 | 352 | 70 | 95 | 352 | 70 | 40 | 2.5 | 97.5 |
| 22' | 352 | 230 | 325 | 352 | 230 | 250 | 2.5 | 97.5 |
| 22" | 352 | 225 | 760 | 352 | 225 | 755 | 2.5 | 97.5 |
| 26 | 1290 | 225 | 780 | 1290 | 225 | 780 | 23 | 77 |
| 27 | 1642 | 225 | 775 | 1642 | 225 | 775 | 18.5 | 81.5 |
| 34 | 319 | 70 | 40 | 319 | 70 | 40 | 2.5 | 97.5 |
| 35 | 100 | 75 | 40 | 100 | 75 | 40 | 95 | 5 |
| 36 | 33 | 75 | 40 | 33 | 75 | 40 | 2.5 | 97.5 |
| 48 | 33 | 215 | −262 | 33 | 215 | −262 | 2.5 | 97.5 |
| 49 | 100 | 78 | −264 | 100 | 78 | −264 | 95 | 5 |
| 58 | 319 | 73 | −290 | 319 | 73 | −290 | 2.5 | 97.5 |

I claim:

1. A method for preparing feed air for separation by cryogenic rectification in a double column air separation facility, whereby the preparatory steps of compression, cooling and cleaning of the feed air are carried out by an integrated system, comprising:

(a) compressing feed air;
(b) cooling the compressed feed air;
(c) passing the cooled, compressed feed air through a first purifier containing heat regenerable adsorbent wherein the air is substantially cleaned of impurities by transfer of the impurities to the adsorbent;
(d) introducing the cleaned, cooled, compressed feed air into an air separation facility wherein a higher pressure column and a lower pressure column are in heat exchange relation;
(e) separating the feed air by cryogenic rectification in the air separation facility into nitrogen-rich and oxygen-rich components;
(f) withdrawing a nitrogen-rich portion from the higher pressure column, expanding the withdrawn portion and warming the expanded withdrawn portion by indirect heat exchange with the cleaned, cooled, compressed feed air prior to its introduction into the air separation facility;
(g) warming the withdrawn expanded portion by indirect heat exchange with at least a portion of the cooling compressed feed air of step (b);
(h) passing the warmed portion through a second purifier containing heat regenerable adsorbent which contains impurities so as to transfer those impurities to the warmed portion and thus clean the adsorbent;
(i) expanding the impurity-containing portion through an expansion turbine for the production of external work;
(j) employing at least a portion of said external work to compress the feed air of step (a); and
(k) periodically switching the first and second purifiers so that during the switched time the cooled compressed feed air passes through the second purifier containing adsorbent which has been cleaned during the previous period, and the warmed portion passes through the first purifier to remove impurities from the adsorbent deposited there during the previous period.

2. The process of claim 1 wherein the heat regenerable adsorbent is molecular sieve.

3. The process of claim 1 wherein the feed air is compressed to a pressure in the range of from about 85 to 493 psia.

4. The process of claim 1 further comprising combining the impurity-containing portion with a nitrogen-rich stream taken from the air separation facility, prior to expansion in the expansion turbine.

5. The process of claim 1 further comprising compressing the impurity-containing portion prior to its expansion in the expansion turbine.

6. The process of claim 5 wherein the impurity-containing portion is compressed to a pressure of at least 85 psia.

7. The process of claim 1 wherein oxygen is recovered from the air separation facility having a purity in the range of from about 90 to 99.5 percent.

8. The process of claim 1 further comprising mixing oxidant and fuel in a combustion zone, combusting the mixture at pressure and expanding the resulting combustion gases through the expansion turbine.

9. The process of claim 8 wherein the ignition pressure in the combustion zone is at least 85 psia.

10. The process of claim 8 wherein the oxidant is compressed air.

11. The process of claim 8 wherein the impurity-containing portion is provided to the combustion zone with the oxidant.

12. The process of claim 8 wherein the impurity-containing portion is combined with the resulting combustion gases prior to expansion through the turbine.

13. The process of claim 1 wherein the flowrate of the withdrawn portion is from 5 to 20 percent of the feed air flowrate.

14. The process of claim 1 further comprising cooling the cleaned purifier prior to the periodic switch of step (K).

15. The process of claim 14 wherein said cooling of the cleaned purifier is accomplished by passing a nitrogen-rich stream through the purifier.

* * * * *